(12) United States Patent
Vendrow

(10) Patent No.: US 8,976,230 B1
(45) Date of Patent: Mar. 10, 2015

(54) USER INTERFACE AND METHODS TO ADAPT IMAGES FOR APPROXIMATING TORSO DIMENSIONS TO SIMULATE THE APPEARANCE OF VARIOUS STATES OF DRESS

(75) Inventor: Vlad Vendrow, Redwood City, CA (US)

(73) Assignee: Vlad Vendrow, Redwood City, CA (US)

( * ) Notice: Subject to any disclaimer, the term of this patent is extended or adjusted under 35 U.S.C. 154(b) by 741 days.

(21) Appl. No.: 13/170,078

(22) Filed: Jun. 27, 2011

Related U.S. Application Data

(60) Provisional application No. 61/359,287, filed on Jun. 28, 2010.

(51) Int. Cl.
| | |
|---|---|
| *H04N 5/00* | (2011.01) |
| *H04N 5/76* | (2006.01) |
| *H04N 13/02* | (2006.01) |
| *G01S 17/89* | (2006.01) |
| *G03H 1/00* | (2006.01) |

(52) U.S. Cl.
CPC ... *H04N 5/76* (2013.01); *G03H 1/00* (2013.01)
USPC .......................................................... 348/46

(58) Field of Classification Search
None
See application file for complete search history.

(56) References Cited

U.S. PATENT DOCUMENTS

| | | | | |
|---|---|---|---|---|
| 6,813,440 | B1 * | 11/2004 | Yu et al. ........................ | 396/14 |
| 7,418,116 | B2 * | 8/2008 | Fedorovskaya et al. ...... | 382/118 |
| 2009/0115892 | A1 * | 5/2009 | Sako et al. ................... | 348/376 |
| 2010/0070384 | A1 | 3/2010 | Kruusmaa et al. | |
| 2012/0320052 | A1 * | 12/2012 | Givon ........................... | 345/420 |
| 2013/0195330 | A1 * | 8/2013 | KIM et al. .................... | 382/128 |

OTHER PUBLICATIONS

Macsai, Dan, "The Naked Truth About Presselite's "Nude it" iPhone App", Jan. 6, 2010. FastCompany.com, <http://www.fastcompany.com/blog/dan-macsai/popwise/naked-truth-about-presselites-nude-it-iphone-app>.

* cited by examiner

*Primary Examiner* — Jayanti K. Patel
*Assistant Examiner* — Reza Aghevli
(74) *Attorney, Agent, or Firm* — Kokka & Backus, PC

(57) ABSTRACT

Embodiments of the invention relate generally to computer-implemented image capture and processing, and more particularly, to user interfaces, systems, computer-readable media, and methods for approximating torso dimensions of a subject in an image to, for example, simulate appearance of the subject in various states of dress and/or generate imagery including different simulated layers of clothing for the subject of the image.

18 Claims, 17 Drawing Sheets

USER INTERFACE AND METHODS TO ADAPT IMAGES FOR APPROXIMATING TORSO DIMENSIONS TO SIMULATE THE APPEARANCE OF VARIOUS STATES OF DRESS

CROSS-REFERENCE TO RELATED APPLICATION

This application is a U.S. Nonprovisional Patent Application that claims the benefit of U.S. Provisional Patent Application No. 61/359,287, filed on Jun. 28, 2010, and entitled "USER INTERFACE AND METHODS TO ADAPT IMAGES FOR APPROXIMATING TORSO DIMENSIONS TO SIMULATE THE APPEARANCE OF VARIOUS STATES OF DRESS," which is herein incorporated by reference for all purposes.

FIELD

Embodiments of the invention relate generally to computer-implemented image capture and processing, and more particularly, to user interfaces, systems, computer-readable media, and methods for approximating torso dimensions of a subject in an image to, for example, simulate appearance of the subject in various states of dress and/or generate imagery including different simulated layers of clothing for the subject of the image.

BACKGROUND

Conventional mobile computing devices include cameras to capture images digitally and processor capabilities that enable the mobile computing devices, such as smart phones, to facilitate the use of various "apps," or applications. Thus, the programming flexibility of such mobile computing devices enables these devices to be used as tools for applications beyond traditional uses as a personal digital assistant or phone.

A conventional application superimposes an image of a body and purports to be able to match the image of the body to a body part in a captured image, such as the head of a person. There are various drawbacks to this conventional approach. For example, a static predetermined body is used to superimpose over the body of the subject in the image. In one instance, the static predetermined body does not readily adapt to match the proportions of the person's head. The minimal or negligible ability to match the proportions of original and simulated body parts results in a perceived disjoint combination of images rather than a life-like replica of the subject in the image. Further, such application are not well-suited to capture images and determine whether an article clothing to be worn by a user or the object of the image may be visually pleasing, prior to actually wearing the article of clothing.

It would be desirable to provide improved techniques, user interfaces, systems, computer-readable media, and methods that minimize one or more of the drawbacks associated with conventional techniques for processing images.

BRIEF DESCRIPTION OF THE FIGURES

The invention and its various embodiments are more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Various embodiments or examples of the invention may be implemented in numerous ways, including as a user interface, a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

Figure 1A:
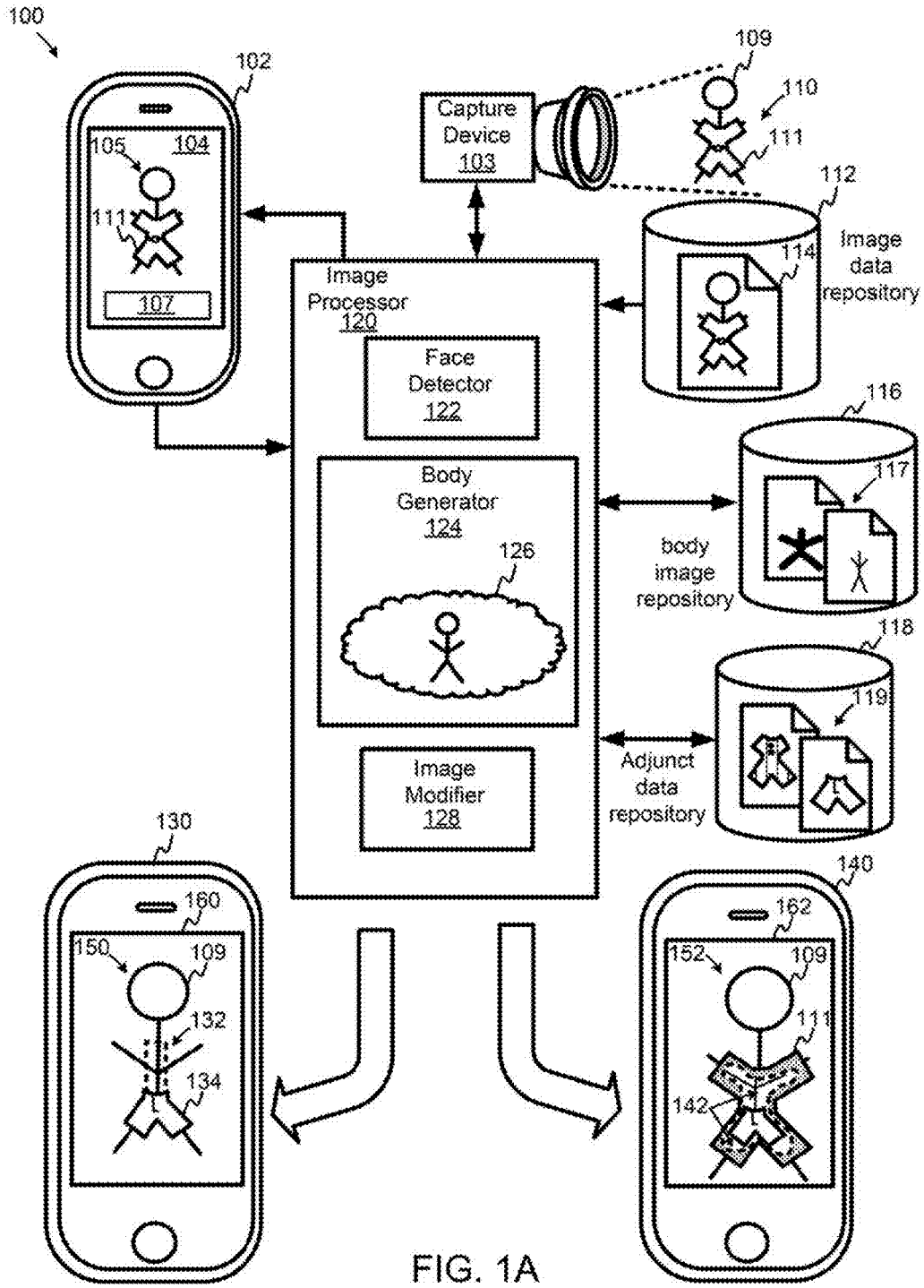
FIG. 1A is a diagram depicting an image processor, according to various embodiments.

FIG. 1A is a diagram 100 depicting an image processor 120, according to various embodiments. In this example, image processor 120 is configured to interact with sources of images and a user interface 104 of a computing device 102 to process a source image 105 to generate one or more approximated body portions, such as a torso, that are substantially consistent with a reference body portion, such as a head or face 109. Further, image processor 120 is configured to generate the one or more approximated body portions in a manner that simulates the appearance of the one or more approximated body portions in various states of dress, including generated imagery that can simulate different layers of clothing for the one or more approximated body portions for a subject 110 of the source image 105. In one embodiment, image processor 120 is configured to generate one or more simulated body part portions for display in result image 150 for user interface 160 of computing device 130. A simulated body part or portion may or may not be formed using an approximated body part or portion. As shown, result image 150 includes a reference body portion, such as head/face 109, and a body portion that is simulated, such as simulated torso 132. In some examples, image processor 120 can be configured to generate adjunct imagery, such as simulated clothing 134 (e.g., a simulated swim suit, a simulated hat, etc.), accessories, and the like. In another embodiment, image processor 120 is configured to generate one or more simulated body part portions for display as part of or in result image 152 for user interface 162 of computing device 140. As shown, a result image 152 includes a reference body portion, such as head/face 109, and layer of clothing 111 (or a portion thereof). Note that the reference body portion and layer of clothing 111 are shown in FIG. 1A as part of a source image in user interface 104 as well as in the result image 152 of user interface 152. In some examples, image processor 120 can be configured to maintain portions of layer of clothing 111 at, for instance, the periphery of the layer of clothing 111 originating from the source image, while image processor 120 can generate adjunct imagery, such as simulated clothing (e.g., a simulated swim suit), in an interior view image portion 142. Interior view image portion 142 includes a simulated body portion, such as a simulated torso, and simulated clothing as an adjunct image within one or more boundaries of layer of clothing 111 from source image 105. Note that while computing devices 102, 130 and 140 are depicted separately, computing devices 102, 130 and 140 can be the same device and are shown separately to depict different imagery associated with the user interfaces. Note, too, computing devices 102, 130 and 140 can be mobile communication devices each including a processor, memory and a user interface, which can be touch-sensitive.

In view of the foregoing, the structures and/or functionalities of image processor 120 can predict the appearance of subject 110 in clothing without having to view a mirror while wearing the garment. Therefore, a user can shop for clothing—and during the shopping experience (e.g., at a clothing store)—the user can take a picture of the user's person for purposes of simulating the appearance of one or more approximated body portions in various states of dress. For example, consider that subject 110 includes a head/face 109 as a reference body part and a layer of clothing 111, which obscures the dimensions of various covered body parts of subject 110, such as the dimensions of the torso, arms, and legs. Image processor 120 is configured to depict the user in an article of clothing within a result image, with either clothed portions being approximated (e.g., as approximated body portions) or unclothed portions being simulated (e.g., as simulated body portions). The user can view how a certain color of clothing or combination of clothing (and/or accessories) will be view when worn, although the user need not disrupt the shopping experience by trying numerous outfits, shirts, pants, and the like.

Continuing with the example shown, layer of clothing 111 can be one or more articles of clothing that constitutes winter attire (e.g., a heavy coat and pants), thereby obscuring the user's body parts that may be of interest. The different layers can be additive (e.g., two or more layers of cloths simulated as being on top of each other) or separate (e.g., different layers can be simulated separately). Should the user be shopping for summer or warmer weather attire, the body parts of interest, including the torso, are obscured from view. The image generator is configure to predict the appearance of the obscured parts. In one embodiment, image processor 120 can be configured to generate interior view image portion 142, thereby obviating the need to determine precise dimensions for body parts covered by layer of clothing 111. Further, a determination of a boundary of the body in the source need not be required. Thus, the generation of interior view image portion 142 can conserve computational resources as the entire body or it boundaries need not be simulated or determined. For example, interior view image portion 142 can be composed of data representing pixels that can be integrated (e.g., overlaid or superimposed over pixels representing layer of clothing 111) to form result image 152. Thus, a user has access to generated imagery to predict the appearance of the user in an article of clothing. In another embodiment, image processor 120 can be configured to predict the unclothed appearance of one or more body portions, such as the torso, arms or legs, to generate one or more approximated body portions relative to a reference body portion. Once the unclothed appearance of one or more body portions (e.g., approximated body portions) can be determined, then adjunct imagery, such as simulated clothing 134, can be sized to fit a simulated body portion and integrated into result image 150. Therefore, a user can predict how under-garments, swim suits, and the like can appear without wearing the garments.

Source image 110 can be generated by using an image capture device 103, such as a camera, retrieved from an image date repository 112 (e.g., from an image file 114), or any other known technique of acquiring data representing an image to be processed by image processor 120. Capture device 103 can be formed as part of computing device 102 or separately therefrom. Image processor 120 can be configured to receive signals from computing device 102 responsive to user interaction with portion 107 of user interface 104. The signals can be configured to, for example, guide the body detection and image modification processes.

Image processor 120 includes a face detector 122, a body generator 124 and an image modifier 128, according to various embodiments. Face detector 122 is configured to identify the face of subject 110 in, for example, image 105, whereby the face in this example serves as a reference body part from which information is used to generate one or more body parts including the torso. According to some embodiments, the term "reference body portion" can refer to, for example, a portion of a body that serves as a reference for generating or describing physical representations of an approximate body portion and/or a simulated body portion. In some cases, an approximate body portion and/or a simulated body portion can be adjusted in size or dimension to a range of sizes in which the approximated body portion is proportional to the reference body portion, such as a face. The range of sizes to achieve proportionality can be determined by the user or by relationships (e.g., algorithmically using, for instance, statistical or mathematical relationships) between body parts, such as' depicted in FIG. 8. Based on the size and/or position of the face or head, a simulated torso 126 (or portions thereof) and, optionally the limbs (or portions thereof), can be determined by body generator 124. In some embodiments, face detector 122 is configured to identify features that collectively constitute a face, and, as such, face detector 122 can automatically detect and/or identify a face associated with source image 105. In at least one embodiment, face detection can be performed manually responsive to user interaction with user interface 104. Further, face detector 122 can also be configured to generate attribute data, such as face size, the position of the head, color, as well as other information (e.g., whether subject 110 is more likely male or female), etc. In some embodiments, face detector 122 can be configured to detect hair for purposes of determining gender and/or for removal to enhance accuracy of face size dimensions, as well as neck and shoulder dimensions and boundaries.

Body generator 124 is configured to determine one or more approximated body parts including an approximated torso for generating a simulated torso. In one embodiment, body generator 124 is configured to generate an approximated torso as a function of a silhouette of a body or torso. A silhouette, for example, can be composed of pixels, whereby the pixel data visually represents a boundary of the approximated torso used to generate a simulated torso. Body generator 124 is configured to receive attribute data specifying the relative size and position of the face to set the size of the approximated torso proportionate to the face, and to position the approximated torso at an appropriate distance (e.g., a height of a neck). In at least one instance, the silhouette of a torso can be positioned over the approximate location of the torso of subject 110. In various embodiments, an approximated or simulated body portion can described by data representing dimensions either in two dimensional space or three dimensional space, whereby a simulated body portion can, for example, be derived from a data model representing a three dimension model of the user.

Body generator 124 is configured to detect the body or torso of a subject (i.e., body detection) and/or select a body or torso as a simulated body or torso (i.e., body selection) for integration into a result image, accord to various embodiments. In some examples, the term "body detection" can refer to the determination or detection of one or more approximated body parts including an approximated torso. An approximated body part or portion can describe a clothed body part that is obscured from view in the source image. Body generator 124 operates to detect the approximate dimensions of a body part, such as a torso, for determining the boundaries with which to form a simulated body, especially when the body part is clothed or not visible in the source image. Body detection can also include determining or detecting an actual body or torso and dimensions thereof (e.g., for modifying the appearance of a subject wearing minimal clothing, such as a swim suit, when the actual body or torso can readily be detected). An approximated body part can be described by a set of dimensions that are predicted from the source image (e.g., predicted by size of reference body part. Or, a set of dimensions or attributes can be supplied by the user (e.g., a neck size or circumference, a chest size or circumference, a bleep size or circumference, a hip size or circumference, a waist size or circumference, as well as lengths of limbs and portions thereof). Data representing various approximated body portions can be stored in a database against which body part dimensions can be compared to retrieve data about a particular body part (e.g., dimensions of a head can be applied to the data base to find matches to other body part sizes that is proportional to the head). In some embodiments, an approximated body part, such as a torso, can be described by data representing a wire frame model having dimensions as the body part it serves to model, whereby the wire frame model describes generally the geometry (e.g., the contours, shapes, sizes and boundaries) of a particular body part.

In some examples, the term "body selection" can refer to the determination or selection of one or more simulated body parts including a simulated torso. Body selection can include determining or selecting a body part image (e.g., an image of a torso) for integration with the source image to form a result image. In some cases, a simulated body portion can be stored as an image file (e.g., a JPEG file) with other image files of other similar simulated body portions. In at least some examples, body selection can include the construction or generation (e.g., automatic, semi-automatic or manual generation) of an image of body part (e.g., as a computer generated image) to generate a simulated body part. In some embodiments, a simulated body portion can be selected or derived from data representing either a two dimensional or a three dimensional model having dimensions and an appearance as the body part it serves to model, whereby data representing the appearance of the simulated body portion can be applied to an approximated body part (e.g., as a wire frame model) to depict a body part with a specific color, texture, hair color, etc.). For example, computer graphic techniques, such as 2D/3D modeling and/or meshing, can be used to form a 2D/3D rendering of a simulated body portion along with surface treatments (e.g., texture mapping, bump mapping, surface shading, and the like).

Note that body selection need not use data (e.g., image data or attribute data describing body part parameters) derived from body detection, and, as such, body selection need not depend on body detection, according to some embodiments. Thus, body selection and body detection can be performed independent from each other. Note further that body generator 124 need not depend on face detector 122, and, thus, can operate to generate a simulated body part (e.g., simulated torso) independent of face detector 122 and/or data generated therefrom. Therefore, according to some embodiments, a simulated body part (e.g., a simulated body, simulated torso, simulated limb or any other simulated body part) can be determined first and can serve as a reference body part. That is, the simulated body part can be used to determine or select another body part. For example, a simulated torso can be used as a reference body part to detect, select, and/or generate a face or head image. Also, the simulated torso, as a reference body part, can be used to predict the dimensions and/or other attributes for the face or head image for generating a face or a head image.

In one embodiment, the size and/or position of the silhouette (or portions thereof) can be adjusted responsive to signals input into portion 107 of user interface 104, whereby the adjustment facilitates selection of suitable body or torso for simulation. Body generator 124 can select a silhouette that is associated with any of a number of body or torso images in files 117 stored in body image repository 116. Files 117 include data representing various body or torso types that can vary based on size, body weight, gender, body part proportions, etc. Files 117 can include a file having data representing the torso or body of subject 110. In one instance, data representing a body or torso can be selected randomly. Body generator 124 can operate to analyze source image 105 and select a silhouette that matches criteria for determining, for example, the best-fitting torso (e.g., different silhouettes can be gender-specific and vary by age). In some cases, the user can input signals via portion 107 of user interface 104 that specifies attributes such as, for example, the weight and/or height of subject 110, or other related information, that can be used to select one or more body or torso types. In some embodiments, body generator 124 can be configured to generate a simulated body and torso in real-time (or near real-time). In this instance, a silhouette or approximate boundary of an unclothed torso need not be generated. In one embodiment, image detector 120 and/or body generator 124 operate to detect torsos or bodies based either static images or multiple images constituting moving imagery (i.e., video in which one or more perspective views exist) captured by, for example, capture device 103.

Image modifier 128 is configured to modify one or more approximated body parts to generate a simulated torso. In one embodiment, image modifier 128 accesses adjunct data repository 118 to retrieve data in files 119 that represents, for example, different article of clothes (e.g., different undergarments) for integration into image 105. Therefore, a user can view the appearance of the user in result image wearing a particular under-garment. Image modifier 128 can be configured to scale a simulated torso relative to the head or face, and can also resize the result image, according to various embodiments.

In various embodiments, any of the described elements in FIG. 1A can be implemented in hardware or software, or any combination thereof, regardless of whether the elements are distributed throughout a network or reside on a computing device (e.g. a mobile phone) or as server machine (or in a computer-readable medium or media). Note, too, that structures and/or functions shown or described in connection with FIG. 1A can be distributed over one or more elements, in some examples. Computing device 102 can be a computer, a mobile device, camera, camcorder, or any other device with image processing capabilities or a user interface.

Figure 1B:
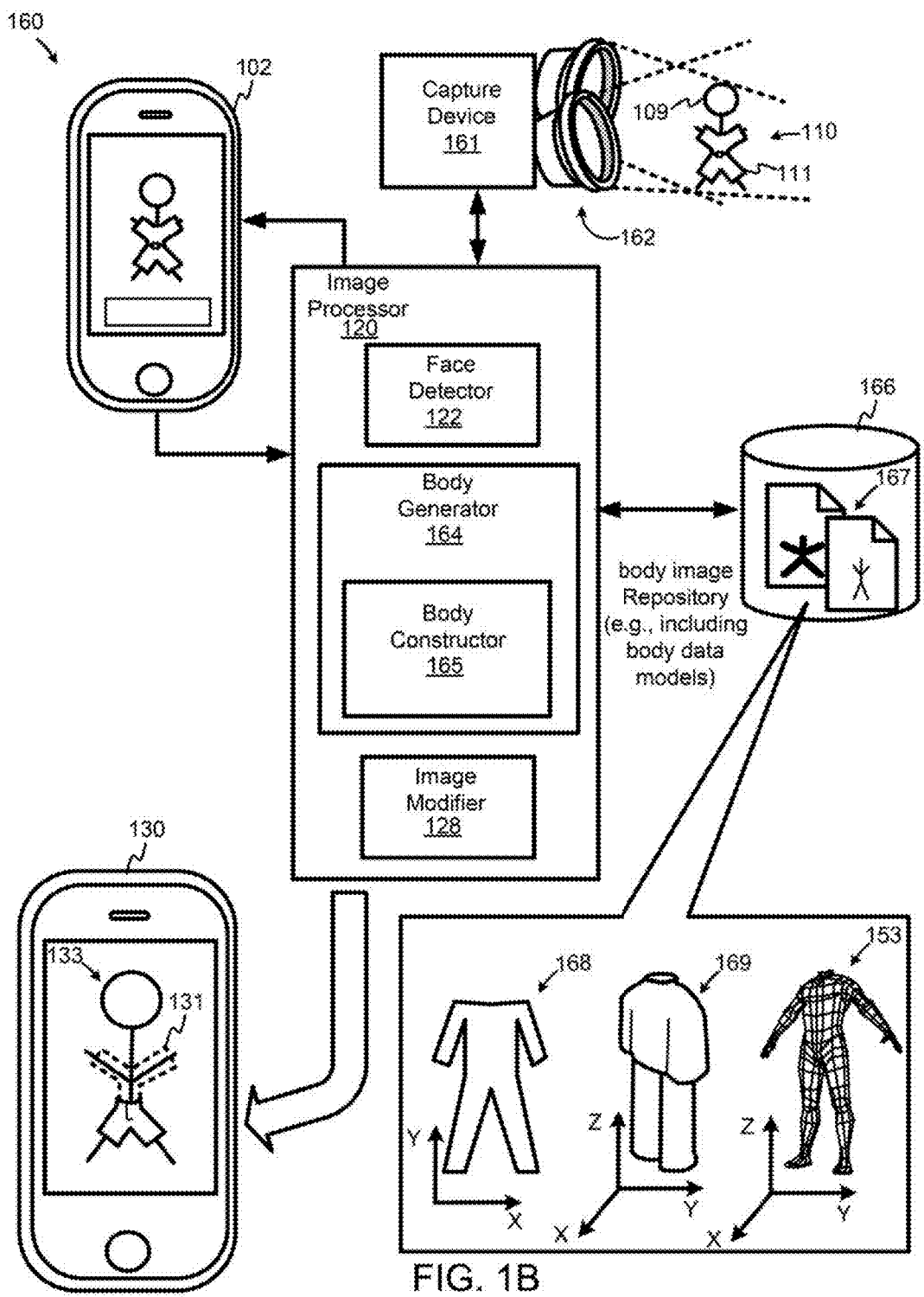
FIG. 1B is a diagram depicting another example of an image processor, according to various embodiments.

FIG. 1B is a diagram 160 depicting another example of an image processor, according to various embodiments. In this example, image processor 120 is configured to interact with sources of images and a user interface of a computing device 102 to process a source image to generate one or more approximated body portions, such as a torso, that are substantially consistent with a reference body portion, such as a head or face. In the example shown, capture device 161 can be configured to capture 3-dimensional images of a subject 110. In some embodiments, capture device 161 is a image capture device or a camera including multiple lenses 162 to implement stereoscopic techniques for creating 3-D source images. Image processor 120 of FIG. 1B includes a face detector 122, a body generator 164 and an image modifier 128, according to various embodiments. Face detector 122 and image modifier 128 can have similar structure and/or functionality as described in FIG. 1A or elsewhere. Body generator 164 includes a body constructor 165 configured to generate a simulated torso or body using, for example, models and other image data stored in, for example, repository 166. Repository 166 includes data files 167 that can include data representations of various modeled body parts. For example, a data file 167 can include data representing a two-dimensional model 168, which can include data relating to dimensions, etc., whereas another data file 167 can include data representing a three-dimensional model 169, which can include other data relating to dimensions, etc. Models 168 and 169 can represent data describing simulated body parts (e.g., with surface treatment). Also, a data file 167 can include data representing a wire frame model 153 (e.g., 3D or otherwise) for describing an approximate body part. Body generator 164 can use models, such as models 168, 169, and 153 to generate a simulated upper body part 131 (including torso and arms) in result image 133 of the user interface or display of device 130.

Figure 1C:
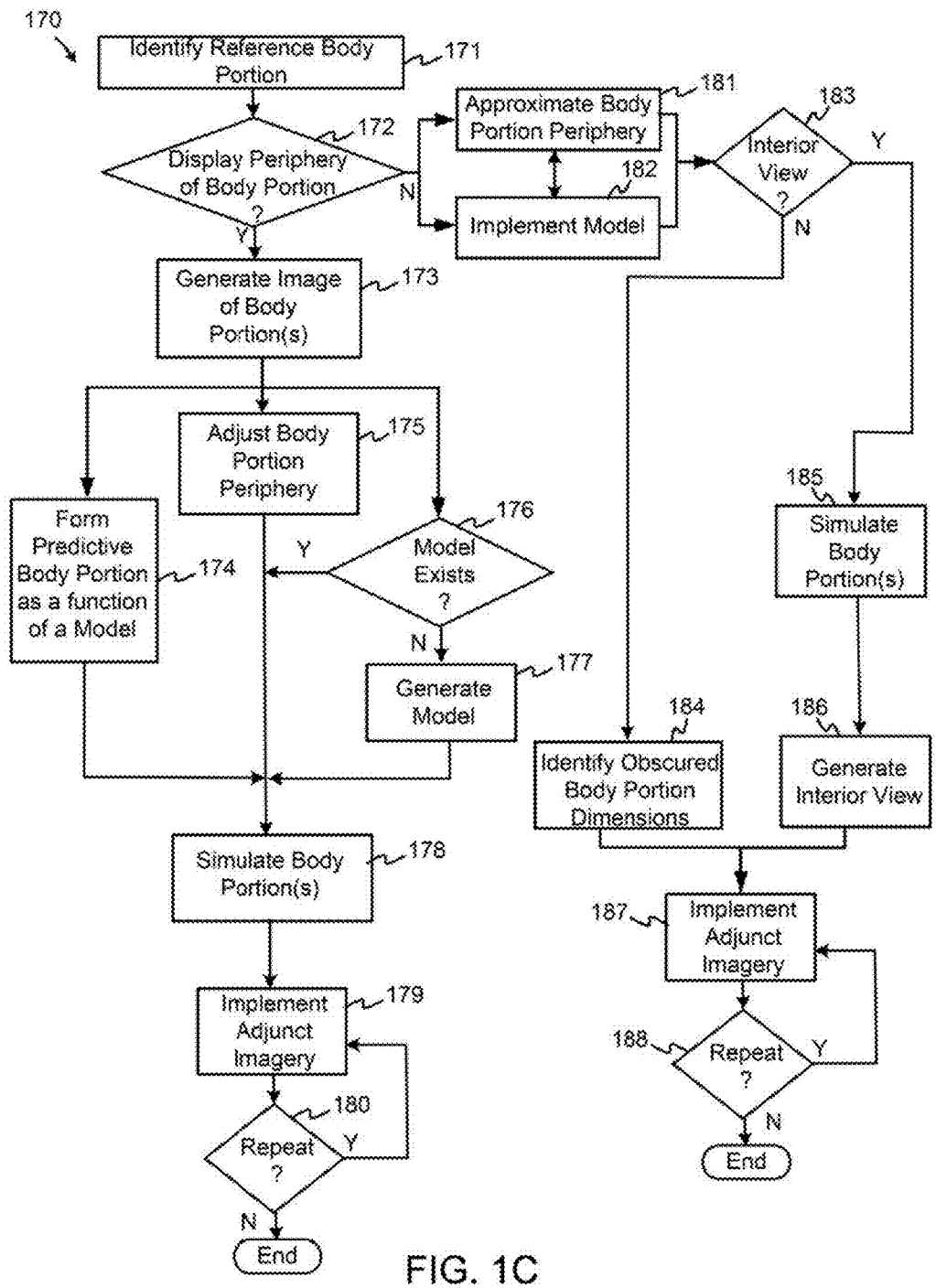
FIG. 1C is an example of a flow for predicting the presentation of adjunct imagery, such as clothing, on a user, according to some embodiments.

FIG. 1C is an example of a flow 170 for predicting the presentation of adjunct imagery, such as clothing, on a user, according to some embodiments. At 171, a reference body portion for a human subject in a source image is identified. The reference body portion displayed in a first interface portion of a user interface can serve as a reference with which to generate an approximated body portion of the human body, or any other body portion. At 172, a determination is made as to whether a periphery of a body portion is to be display, such as whether to display the boundaries or edges of torso and arms. In some embodiments, as decision to determine whether to display adjunct imagery in association with the approximated body portion or to display a simulated body portion can also be performed at 172. If the periphery of the body portion is not to be displayed (i.e., obscured), then flow 170 passes to one or both of 181 and 182. At 181, the periphery of the body portion is approximated, for example, by implementing an adjustable silhouette in association with the source image. The size of the approximated body portion can be adjusted along with the adjustment of the silhouette to match a range of sizes in which the approximated body portion is proportional to the reference body portion. For example, a torso portion from the chin to the navel of a user can be adjusted to be within 2 head units in height relative to the size of the head of the user (i.e., 1 head unit). As such, the head can be the reference body part. Examples of an adjustable silhouette are described in FIGS. 4A to 4C. At 182, a model can be used to describe the dimensions of the approximated body portion that can be presented as an unclothed body portion.

Figure 6A:
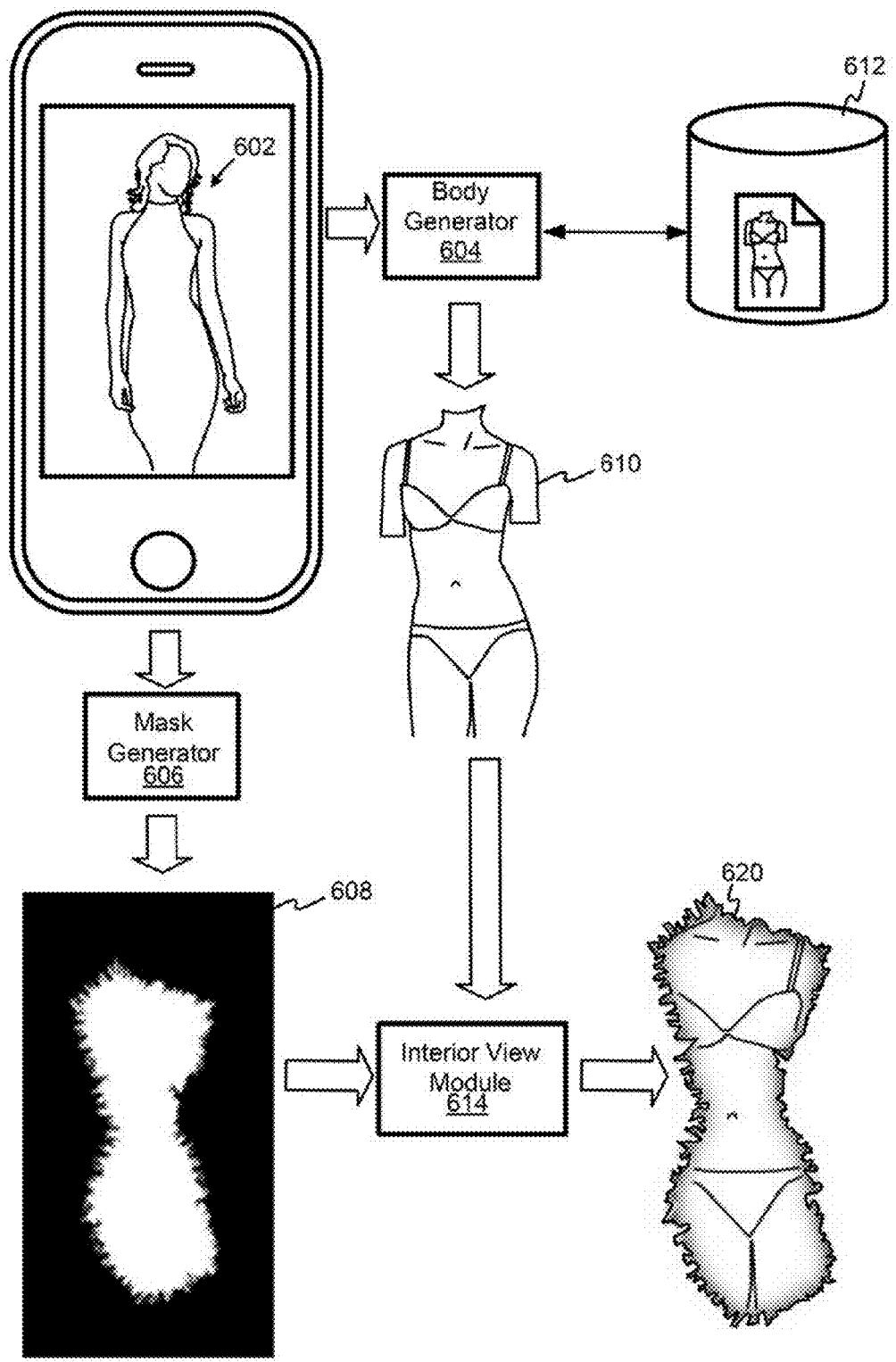
FIGS. 6A and 6B are diagrams depicting an interface configured to interact with an image processor to form an interior view image portion, according to at least one embodiment.
Figure 6B:
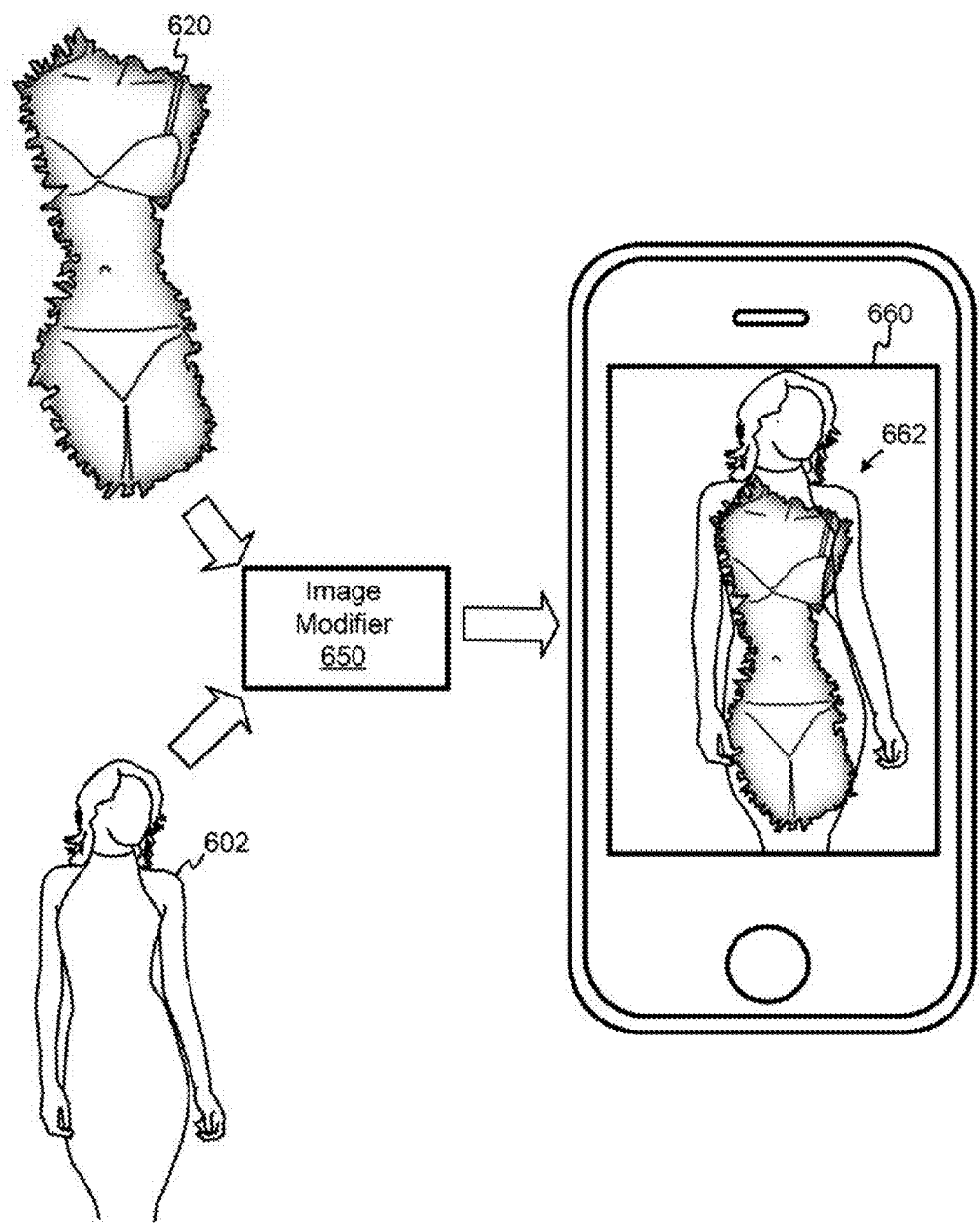

At 183, a decision is made whether to produce an interior view. Examples of the generation of the interior view are depicted in FIGS. 6A and 6B. If an interior view is to be generated, a simulated body portion is generated or otherwise acquired at 185. For example, an unclothed male torso can be simulated in 185. The interior view is generated at 186. In one example, a mask is generated and data is applied to the mask to remove certain portions, with the remaining image data resulting in the simulated body portion that forms the interior view. Note that if an interior view is not to be generated, flow 170 passes from 183 to 184 at which the dimensions of an obscured body portion are identified. Such dimensions define the surface upon which adjust imagery can be superimposed at 187. At 187, adjunct imagery is implemented, whereby the adjunct imagery can represent clothing. The image is modified to include the adjunct image. If the user wishes to "virtually try on" another outfit (e.g., select another article of clothing), flow 170 can repeat at 188 to generate another adjunct image for forming, for example, in the interior view.

Figure 4A:
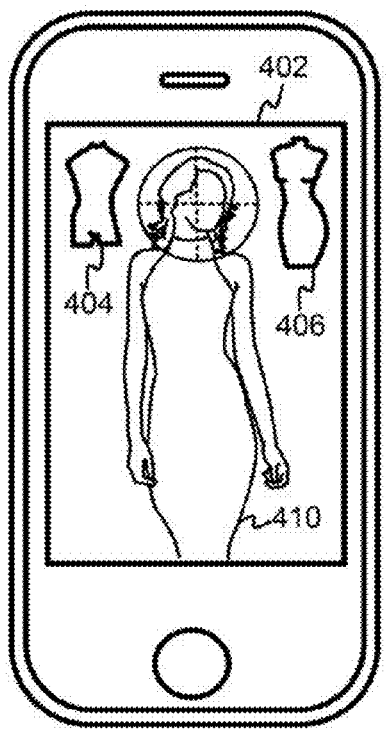
FIGS. 4A to 4C illustrate the use of an image processor configured to interact with a user interface, according to some embodiments.
Figure 9:
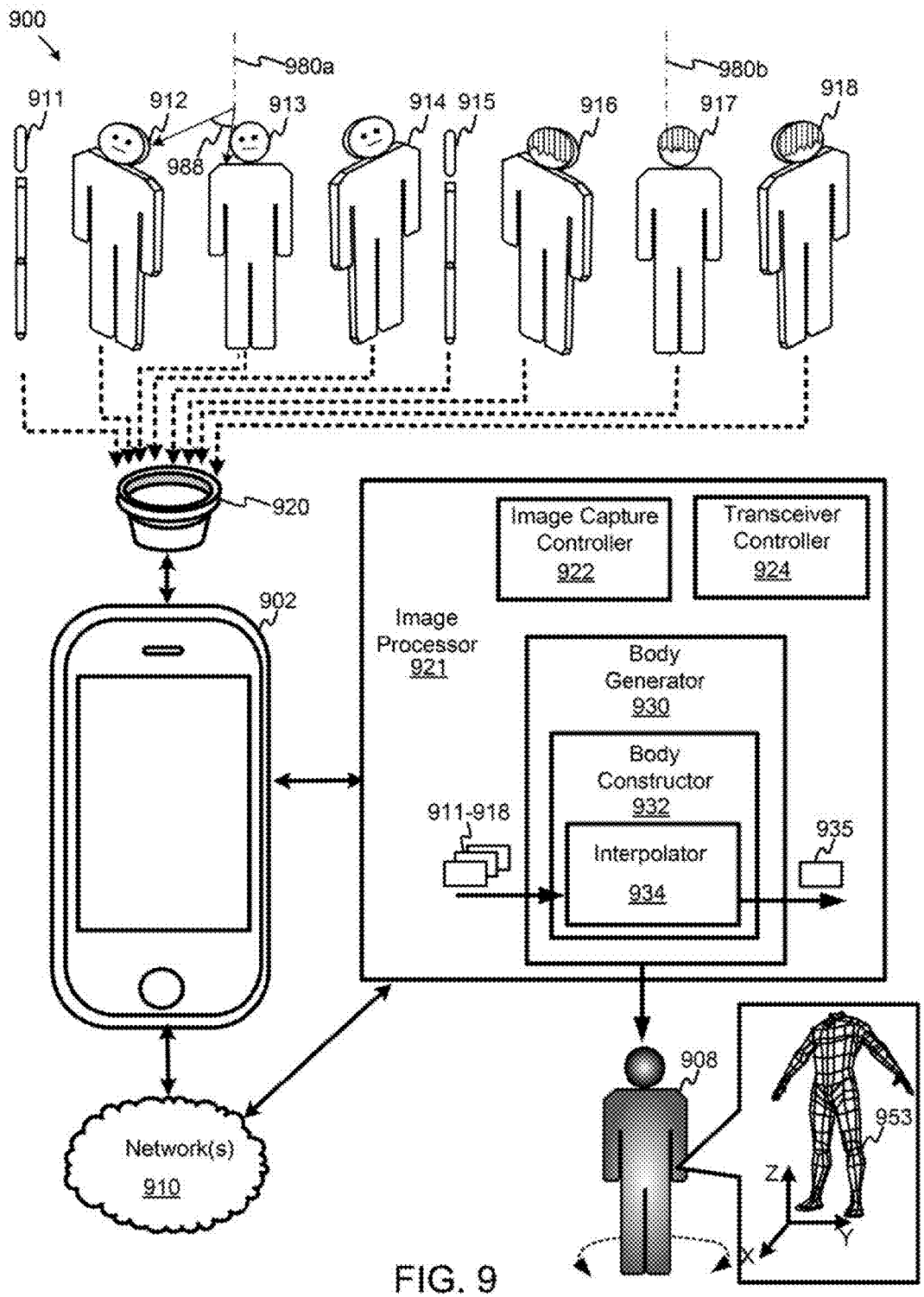
FIG. 9 is a diagram depicting a mobile communication device configured to generate a model, according to at least one embodiment.

Flow 170 passes from 172 to 173 if the periphery of a body portion is to be displayed. At 173, an image of a body portion is generated by using, for example, the subprocesses 174, 175 or 177, one or more of which can be used. At 174, a simulated body portion can be generated as a function of statistical or mathematical model (e.g., by using proportions among body parts). At 175, a simulated body portion periphery can be adjusted by adjusted a silhouette to form at least a portion of the simulated body portion. For example, an image of an unclothed torso can be adapted to fit within the boundaries of the silhouette, with the boundaries of the silhouette being adjusted, as shown in FIGS. 4A to 5. At 176, if a model does not exist, then a model is generated at 177. One example of a subprocess 177 for generating a model, such as a three dimensional model, is shown in FIG. 9. At 178, the output of the subprocesses 174, 175 or 177, whether individually or combined, are used to simulate one or more body portions to form simulated body portions. Thereafter, flow 170 can implement adjunct imagery at 179 and can repeat the implementation of adjunct imager at 180, similar to 187 and 188, as discussed above.

Figure 2:
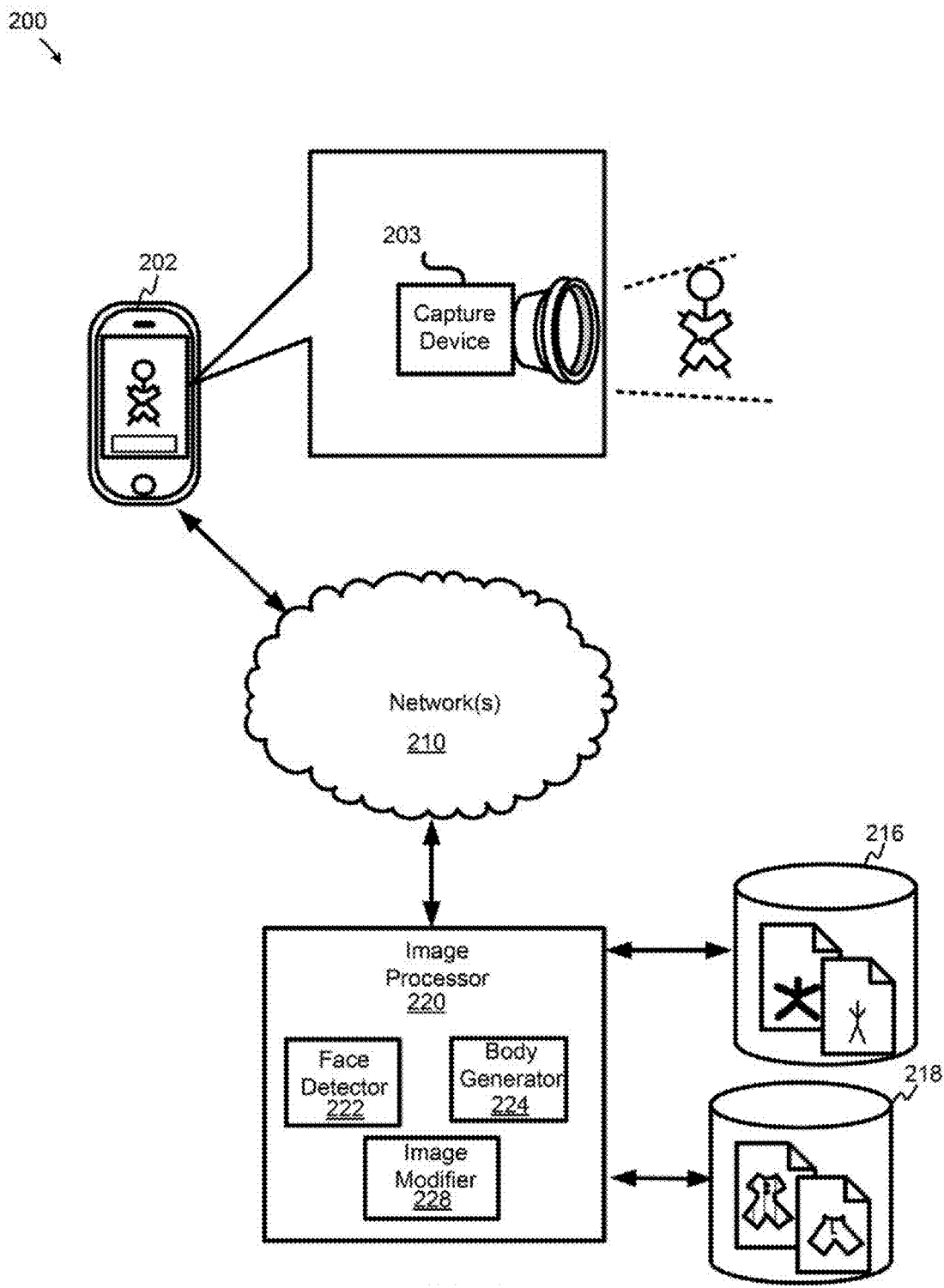
FIG. 2 is a diagram including a distributed image processor, according to various embodiments.

FIG. 2 is a diagram 200 including a distributed image processor, according to various embodiments. In diagram 200, a capture device 203 is integrated into computing device 202, which can be a mobile phone. In the example shown, image processor 220 is accessible via one or more networks 210. Image processor 220 includes a face detector 222, a body generator 224, and an image modifier 228, and is configured to interact with a body image repository 216 and an adjunct data repository 218.

Figure 3:
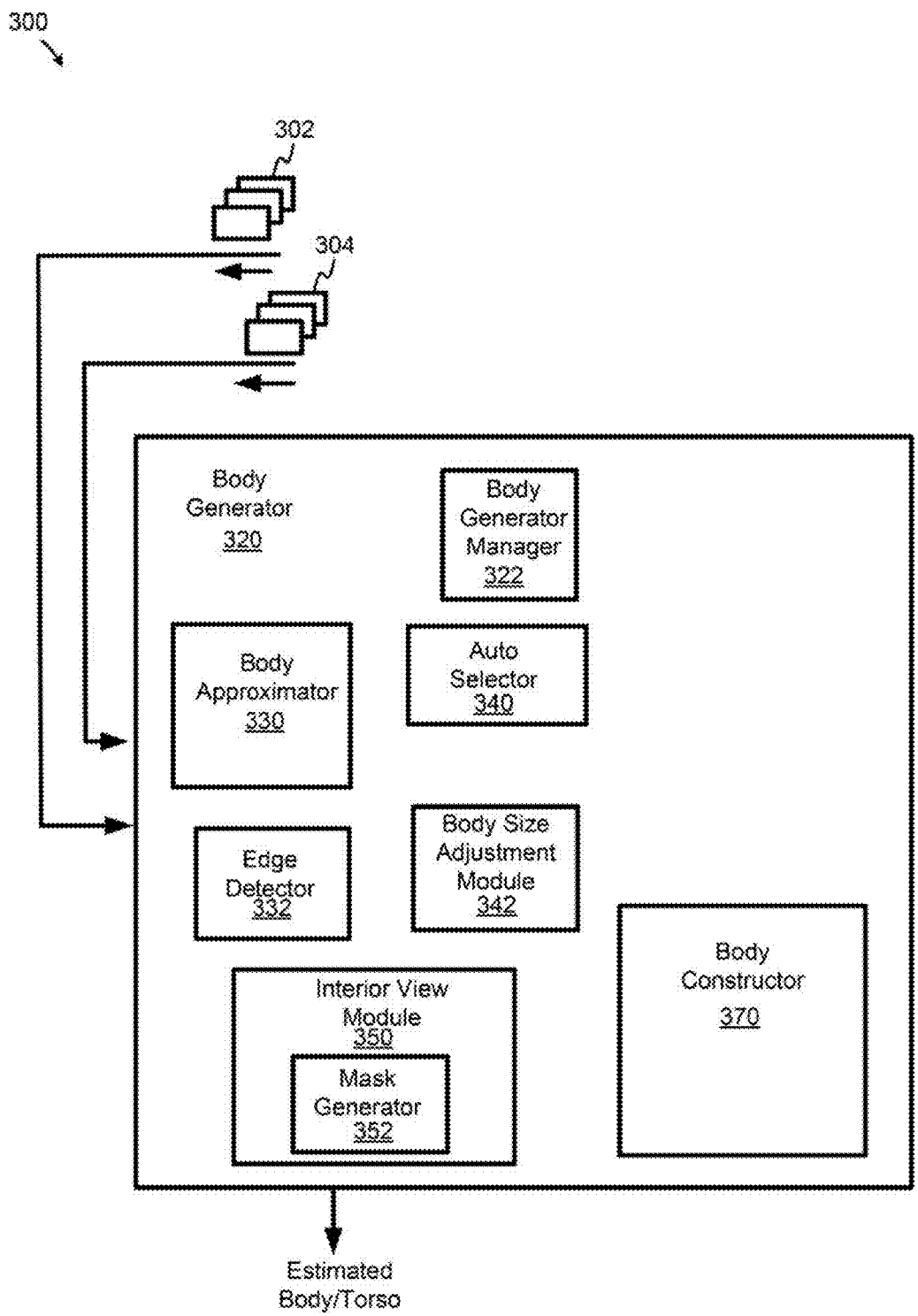
FIG. 3 is a diagram of a body generator, according to some embodiments.

FIG. 3 is a diagram 300 of a body generator, according to some embodiments. In diagram 300, a body generator 320 is shown to include a variety of modules configured to contribute to body detection. Body generation manger 322, which is optional, can be configured to select one of a number of techniques for detecting an approximated body or torso, or for generating a simulated torso. For example, one technique can be a manual body detection process, a second technique can be a semi-automatic detection process, and a third technique can be an automatic process. Body generator 320 can receive data 302 from the face detector and/or user interface for guiding the detection and formation the simulated body or torso, and can receive user-provided data 304, such as height and weight. Data 302 and 304 can be used in the body detection process.

Body approximator 330 can be configured to select a silhouette, which corresponds (e.g., best fitting) to a selected body or image, to generate a simulated body or torso. The silhouette can be adjusted by a user interacting with the user interface to adjust the size of the silhouette. In some embodiments, body approximator 330 can generate an indication for display on the user interface when the silhouette and reference body part (e.g., the face) are not within a range of values indicating that they are proportionate to each other and combinable. The indication can be shown by coloring the silhouette red. In some cases, body approximator 330 operates to facilitate a manual body detection process.

Edge detector 332 is configured to detect edges of features in a digital image by, for example, increasing the visibility of edges and other detail present in a digital image. For example, edge detector 332 can implement Difference of Gaussians ("DoG") techniques or any other similar technique to detect the edges of the layers of clothing in the source image and the edges of the unclothed body parts, such as the head. Auto selector 340 is configured to select data representing pixels constituting a body or torso image that is used to generate a simulated body or torso. In one instance, auto selector 340 selects a torso image that substantially matches or fits into the edges defined by, for example, edge detector 332. Body size adjustment module 342 is configured to generate portions of a silhouette (e.g., points or handles) that enable a user to select a point or portion of a silhouette's boundary and to modify an approximated torso to fit the unclothed torso of the subject. One embodiment of body size adjustment module 342 is shown in FIG. 5. In some cases, auto selector 340 and body size adjustment module 342 operate to facilitate a semi-automatic body detection process. Interior view module 350 is configured to generate a simulated body portion, such as a simulated torso, and simulated clothing, whereby both the simulated torso portion and clothing are integrated into the result image (as an interior view image portion) within the boundaries of a layer of clothing from the source image. Therefore, the precise dimensions of the unclothed torso need not be necessary. In some examples, interior view module 350 can include a mask generator 352 to generate a mask for forming the interior view image portion. Examples of such a mask are shown in FIGS. 6A and 6B. Body constructor 370 is configured automatically generate a simulated torso or body using, for example, computer-generated imagery techniques.

Figure 4B:
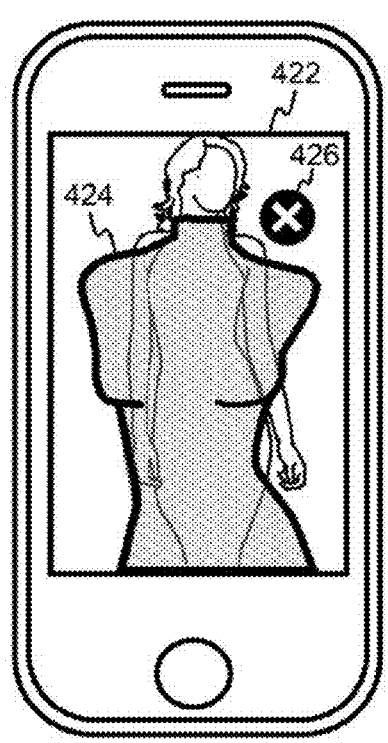
Figure 4C:
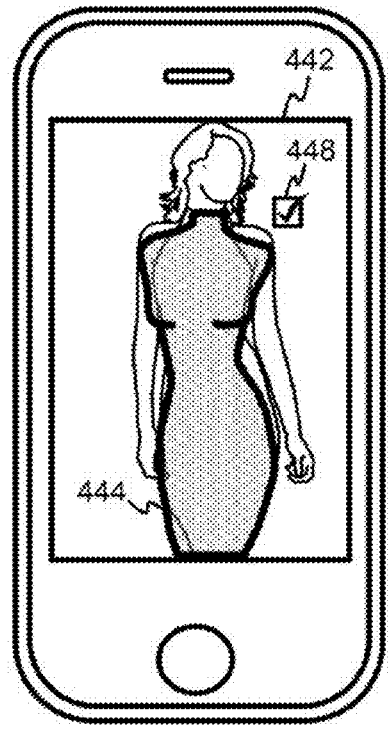
Figure 5:
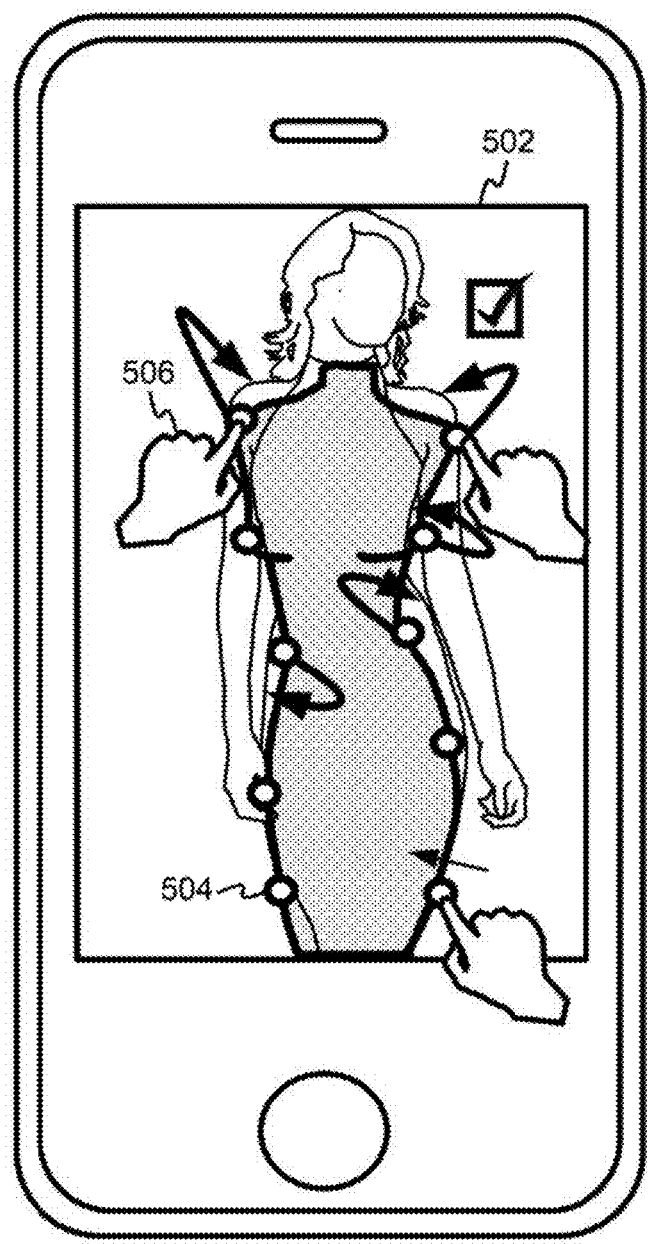
FIG. 5 is a diagram depicting an interface for adjusting a silhouette, according to at least one embodiment.

FIGS. 4A to 4C illustrate the use of an image processor configured to interact with a user interface, according to some embodiments. FIG. 4A depicts a user interface 402 in which a face is identified in the source image, the face being associated with a body or torso 410. The user interface 402 can present a selection of gender-specific approximated torsos, such as a male silhouetted torso 404 and a female silhouetted torso 406. In one cases, user interface 402 can receive signals to select a silhouette from a number of silhouettes, including gender-specific silhouettes. FIG. 4B depicts a user interface 422 after selection of female silhouetted torso 406, whereby a silhouette 424 is visible. As shown, the silhouette is displayed relative to the reference body portion. In this example, silhouette 424 is not proportionate to the reference body part (e.g., the subject's head), and, as such, an indicator 426 specifies the nonproportionality so that the user can adjust the size of silhouette 424. In one embodiment, user interface 402 can accept an adjustment signal to adjust the size of the silhouette to the range of sizes, herein the silhouette represents at least a boundary of the approximated body portion. FIG. 4C depicts a user interface 442 after silhouette 444 is sized proportionate to the subject's head. Thus, an indicator 448 specifies the silhouette is sized properly for generating the simulated torso.

FIG. 5 is a diagram depicting an interface for adjusting a silhouette, according to at least one embodiment. In this example, interface 502 is configured to provide portions of a silhouette that can be selected at a point 504. Points 504 can be portions of a boundary of the silhouette that enable a user to select via a user input 506 (e.g., a cursor, finger, or the like) to grab a portion of a silhouette and to modify an approximated torso to fit the unclothed torso of the subject. Note that points 504 need not be required nor are they required to be depicted as shown in FIG. 5; rather points 504 as depicted in FIG. 5 can represent any point or portion on the edge or boundary of a silhouette that can be used to manipulate or displace any boundary of the silhouette to form a better-fitting approximation to, for example, a torso as an approximated body portion. In particular, interface 502 is configured to accept a modification signal indicative of data representing a displacement (e.g., by grabbing) of a portion of an edge of the silhouette. The displacement of the portion of the edge of the silhouette can be configured to modify, for example, the approximated body portion, but also can be used for a simulated body portion.

FIGS. 6A and 6B are diagrams depicting an interface configured to interact with an image processor to form an interior view image portion, according to at least one embodiment of the invention. In FIG. 6A, an interface is configured to present a source image 602. Body selector 604 is configured select an approximated image 610 from a body image repository 612. Mask generator 606 is configured to generate a mask 608 based on source image 602. Interior view module 614 is configured to generate interior view image portion 620. In FIG. 6B, an image modifier 650 can be configured to integrate interior view image portion 620 and source image 602 to form a result image 662 in user interface 660.

In some embodiments, masks such as mask 608 need not be used. Rather, pixel data representing the layer of clothing can be modified to include coloring or imagery matching a portion of the background of the source image. To illustrate, the image processor can fill the original image where the body is with background imagery by, for example, cloning background around the body. For example, instead of using a mask, image processor can re-paint clothing around the body using a background color using a silhouette in which a simulated body is painted or overlaid in association or within the boundaries silhouette. Thus, the layer of cloths need not be removed and the simulated body or torso can be blended (e.g., integrated) into the original image. The image processor is configured to align the simulated body and blended imagery (e.g., image data of the layer of clothing is replaced with image data derived from the background of the source image) with a face or head.

Figure 7:
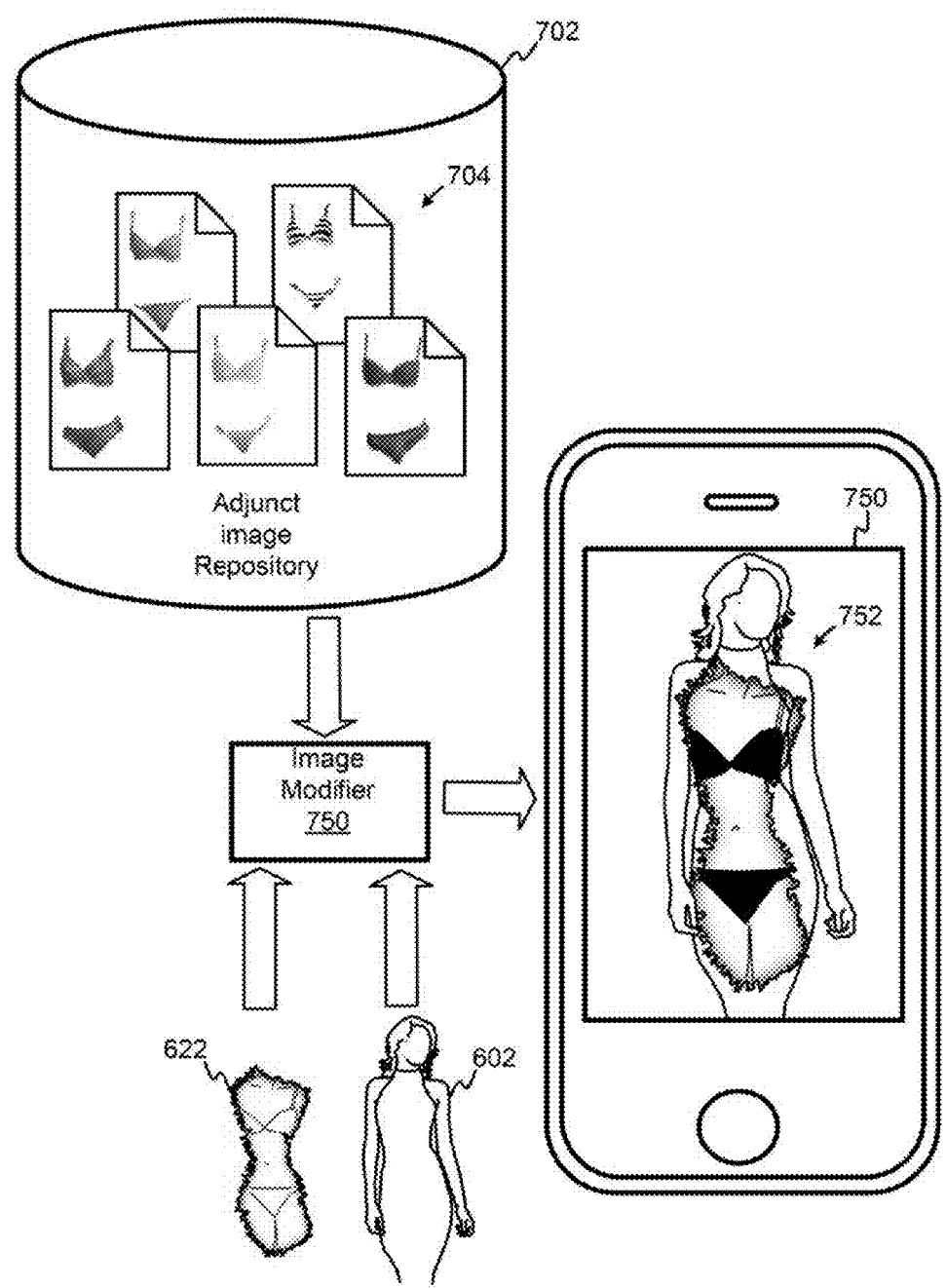
FIG. 7 is a diagram depicting an interface interacting with an image modifier to simulate selection of different articles of clothing, according to at least one embodiment.

FIG. 7 is a diagram depicting an interface configured to interact with an image modifier to simulate selection of different articles of clothing, according to at least one embodiment. In this example, image modifier 750 is configured to modify an image that includes interior view image portion 622 integrated into source image 602, whereby the image is modified to include a replica of an article of clothing that is selected via interface 750. For example, if the user desires a black under-garment, then the user can select an article of clothing from adjunct image repository 702 that includes data files 704 representing different articles of clothing that can be integrated to form the result image 752 in interface 750.

Figure 8:
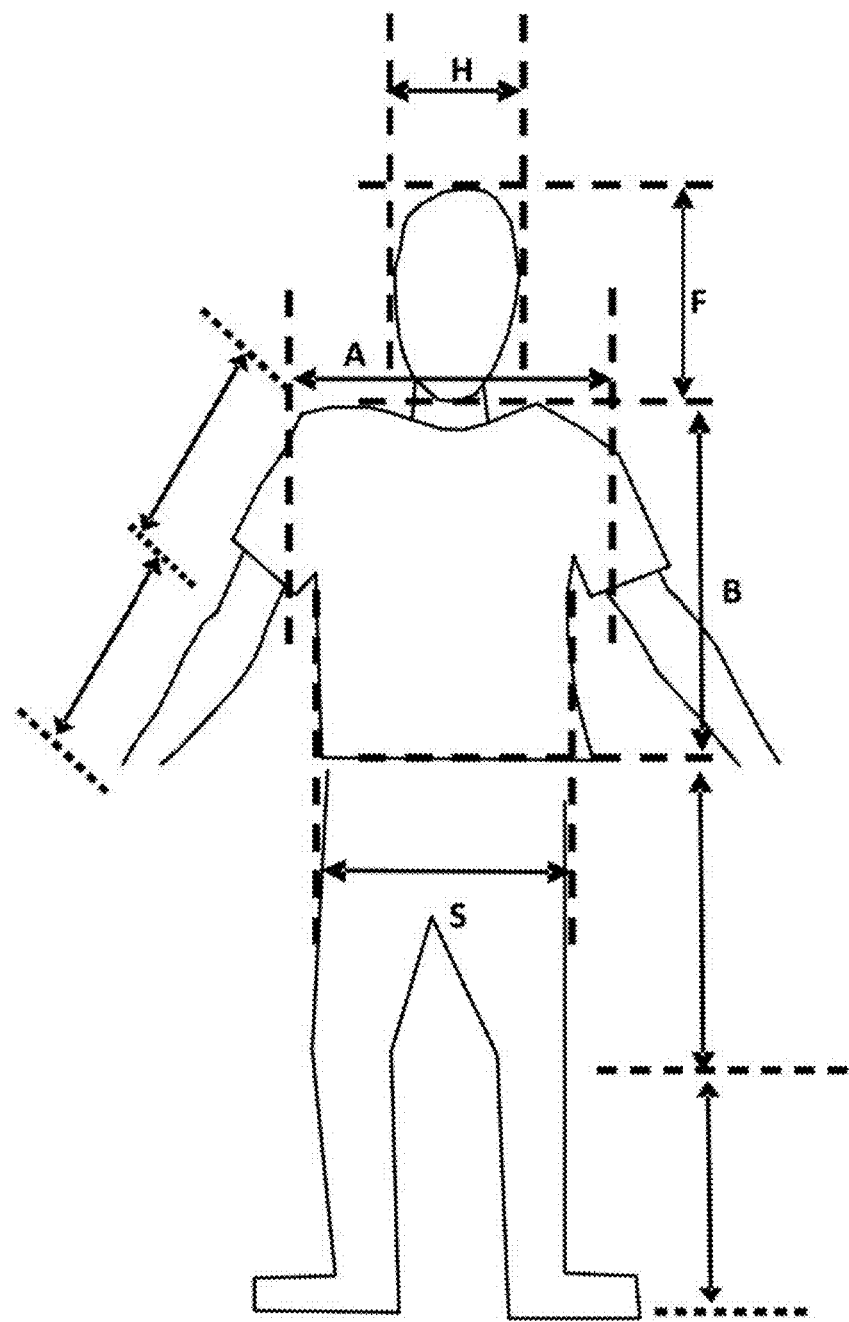
FIG. 8 is a diagram depicting dimensions that can be determined by a body generator, according to at least one embodiment.

FIG. 8 is a diagram depicting dimensions that can be determined by a body generator, according to at least one embodiment. In this example, a body generator can be configured to determine dimensions for generating a simulated torso. For example, the body generator can be configured to determine: head height ("F"), head width ("H"), shoulders width ("A"), torso height ("B"), and torso width ("S"). Other dimension are not shown, but can be used to determine or predict the dimensions of various body parts. For example, in a "8 head unit" model, an adult male has a height that is 8 head units high, with the height of the head being unique to the user. The distance from the chin to navel is two head units, whereas the distance from the chin to the crotch can be 3 head units. The width of an adult male typically is 2½ head units wide. As such, these proportionalities can be used to approximate the size of a torso relative to the head of the user. And a body generator can also determine a skin color with which to color the simulated torso or body. The above-mentioned dimensions can be used to select a best-fitting body or torso image.

FIG. 9 is a diagram depicting a mobile communication device configured to generate a model, according to at least one embodiment. Diagram 900 depicts a mobile communication device 902 including an image capture device 920. An image processor 921 can include an image capture controller 922, a transceiver controller 924 and a body generator 930. In this example, image processor 921 is configured to generate a model (e.g., a three dimensional model). Body generator 930 includes a body constructor 932, which, in turn, includes an interpolator 934. Image capture controller 922 is configured to capture multiple source images 911 to 918 of a human body to generate a three dimensional model. For example, image capture controller 922 is configured to capture successive source images 911, 912, 913, 914, 915, 916, 917, and 918, whereby the images are captured at different periods of time. Transceiver controller 924 is configured a remote model interpolator 934 (not shown) for generating the model. Note that mobile communication device 902 can include image processor 921 or can communicate via network 910 to a remote image processor 921. In one embodiment, image capture device 920 remains stationary, while the subject faces different angles relative to an axis 980a and axis 980b. As shown, the subject changes the direction that the subject faces by an angle 988 (e.g., 45 degree) to capture source image 913 after capturing source image 912. Interpolator 934 is configured to interpolate views of the human subject between two source images, such as between source images 912 and 913, to form interpolated source images 935. Further, interpolator 934 is configured to combine data representing the human body in multiple source images 933 and the interpolated source images to apply as a layer on one or more approximated body portions constituting an approximation of a three-dimensional shape of the human body, thereby forming a three-dimensional model 908. As shown, three-dimensional model 908 can be formed by using a wire frame model 953 as a base upon which images, including interpolated source images, are superimposed to form the three-dimensional model. Note that interpolator 934 can employ other techniques to convert 2D source imagery into 3D imagery for generating a model.

Figure 10:
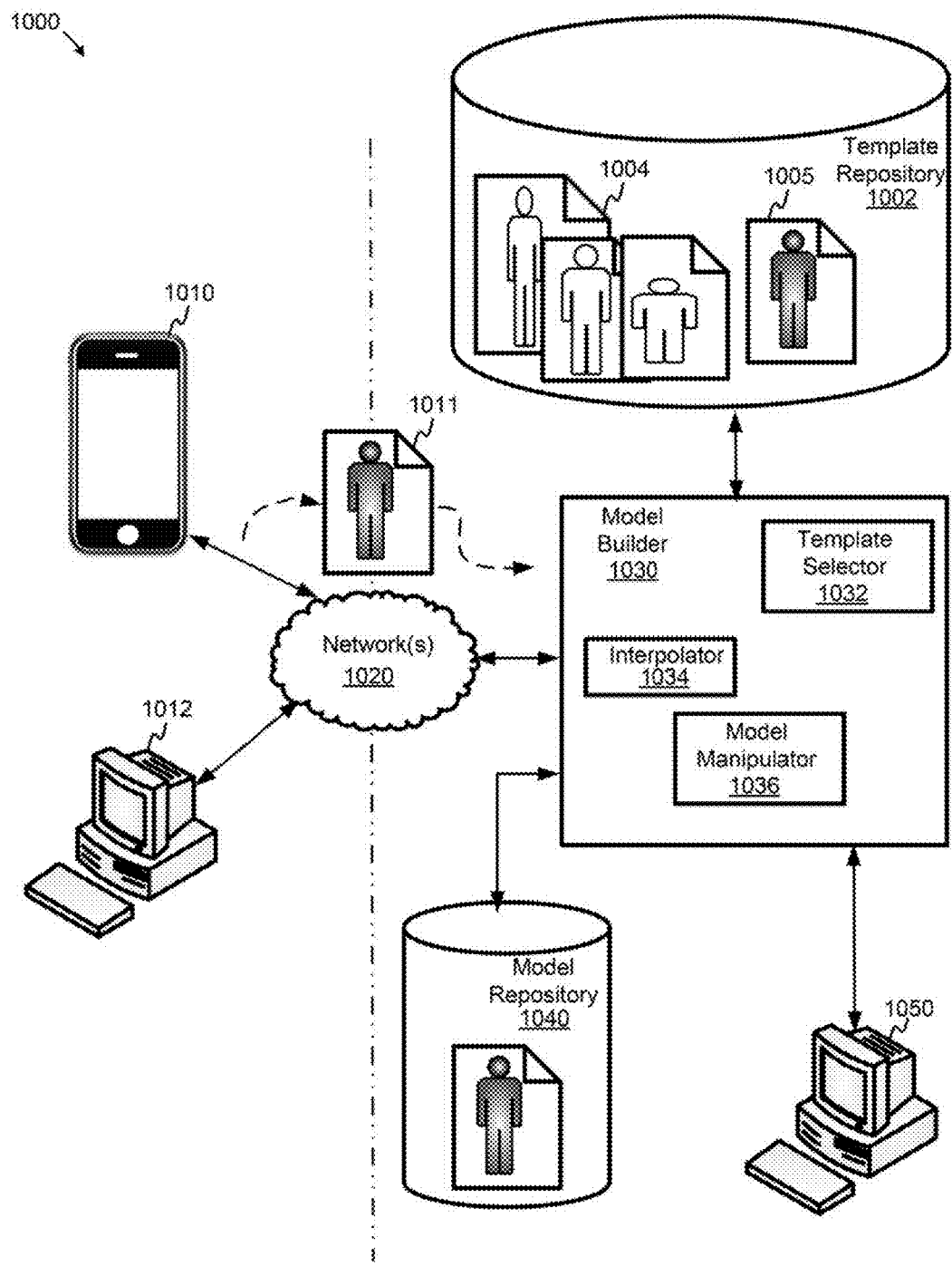
FIG. 10 is a diagram depicting a remote model builder configured to generate a model, according to at least one embodiment.

FIG. 10 is a diagram depicting a remote model builder configured to generate a model, according to at least one embodiment. Diagram 1000 depicts a mobile communications device 1010 and a computing device 1012 that are configured to communicate via network 1020 with model builder 1030. Model builder 1030 is configured to generate a model at a remote computing environment of facilitate generation of the model. Model builder 1030 includes a template selector 1032, an interpolator 1034 and a model manipulator 1036. In one embodiment, a user can transmit one or more source images 1011 to the model builder 1030 to create a model. Note that manual intervention via computing device 1050 can influence the creation of the model by interpolator 1034. In some cases, the user sends a rough version of the model to model builder 1030 or creates a model based on two dimensional models 1004 or three dimensional models 1005. The user can influence operation of template selector 1032 to select a template model with which to alter to form a replica model of the user. Again, an operator via computing device 1050 can activate the model manipulator 1036 to modify the model to form the final version, which can be stored in model repository 1040 or transmitted by to mobile communications device 1010 and a computing device 1012.

Figure 11:
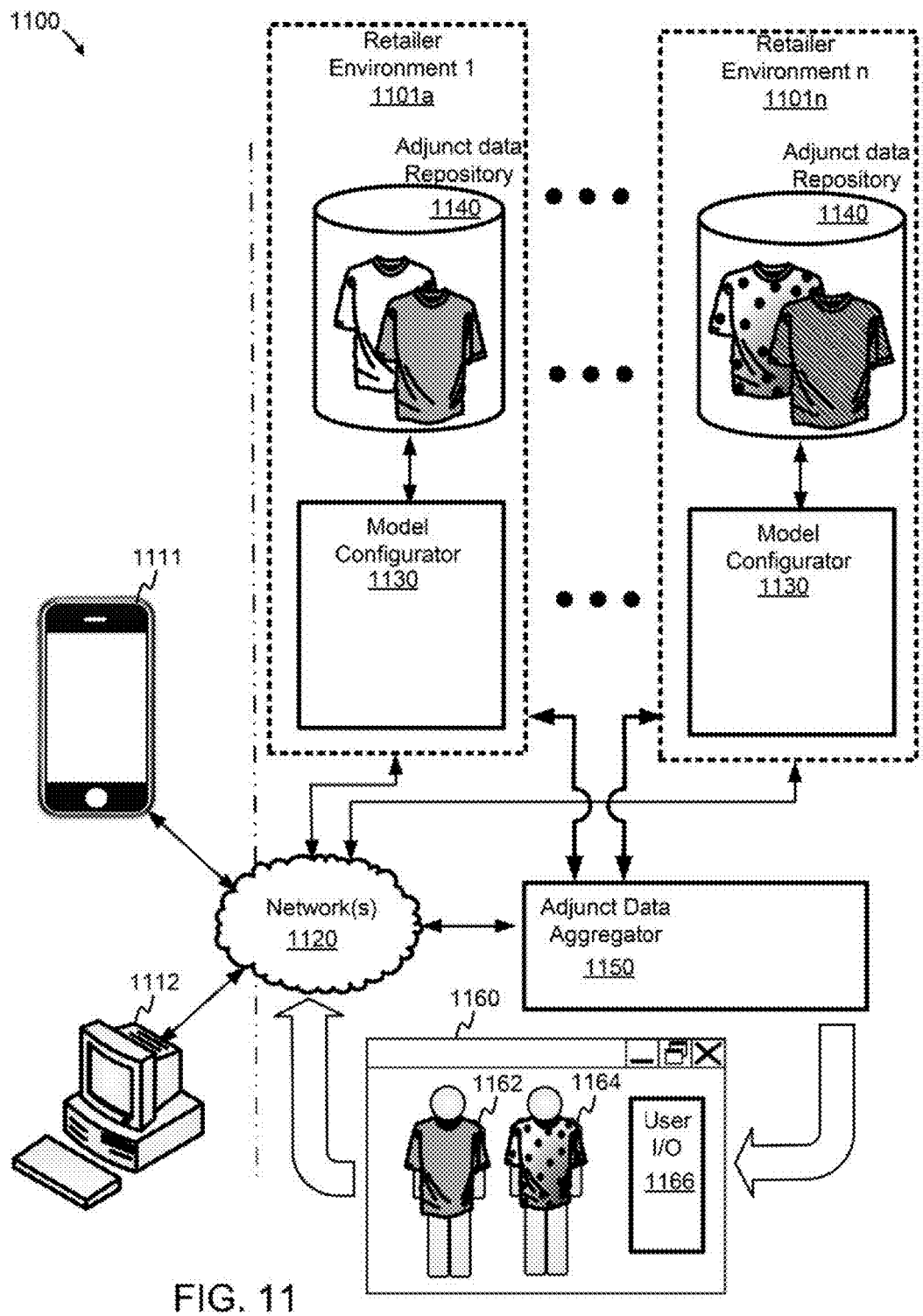
FIG. 11 is a diagram depicting a system from which a user can obtain adjunct imagery from various retail environments, according to at least one embodiment.

FIG. 11 is a diagram depicting a system from which a user can obtain adjunct imagery from various retail environments, according to at least one embodiment. Diagram 1100 depicts a mobile communications device 1111 and a computing device 1112 that are configured to communicate via network 1120 with sources of adjunct imagery. In this example, user can obtain adjunct images produced by proprietors selling cloths. As shown, a first retailer environment ("1") 1101a and any other retailer environments ("n") 1101n that are in business principally to produce or sell merchandise. As shown, retailer environments 1101a and 1101n include an adjunct data repository 1140 for storing adjunct images for clothing for sale. Further, retailer environments 1101a and 1101n each also includes a model configurator that operates to configure a model that the user makes available to retailer environments 1101a and 1101n to include an adjunct image representative of an article of clothing that the user is interested in purchasing. Mobile communications device 1111 and computing device 1112 can include a transceiver controller (not shown) configured to communicate an access code (e.g., a password to gain access to the retailer environments) and data representing the model 1011 (or images therefor) of the human subject via a network 1120 to a server constituting an adjunct data aggregator 1150 configured to aggregate adjunct images from a plurality of different adjunct data repositories 1140 of different retail environments 1101*a* to 1101*n*. The server constituting an adjunct data aggregator 1150 is configured serve web pages that include depictions of a user's model in relation to any adjunct image from any proprietary adjunct data repository 1140. Examples of such web sites include eBay® or any on-line merchant. The transceiver controller is configured further to transmit signals response to interactions by a user with user I/O 1166 via the network to generate displays of the model being associated with the adjunct images and to select one of the adjunct images for a purchase transaction, wherein the adjunct images represent clothing 1162 or 1164 on an interface 1160.

Figure 12:
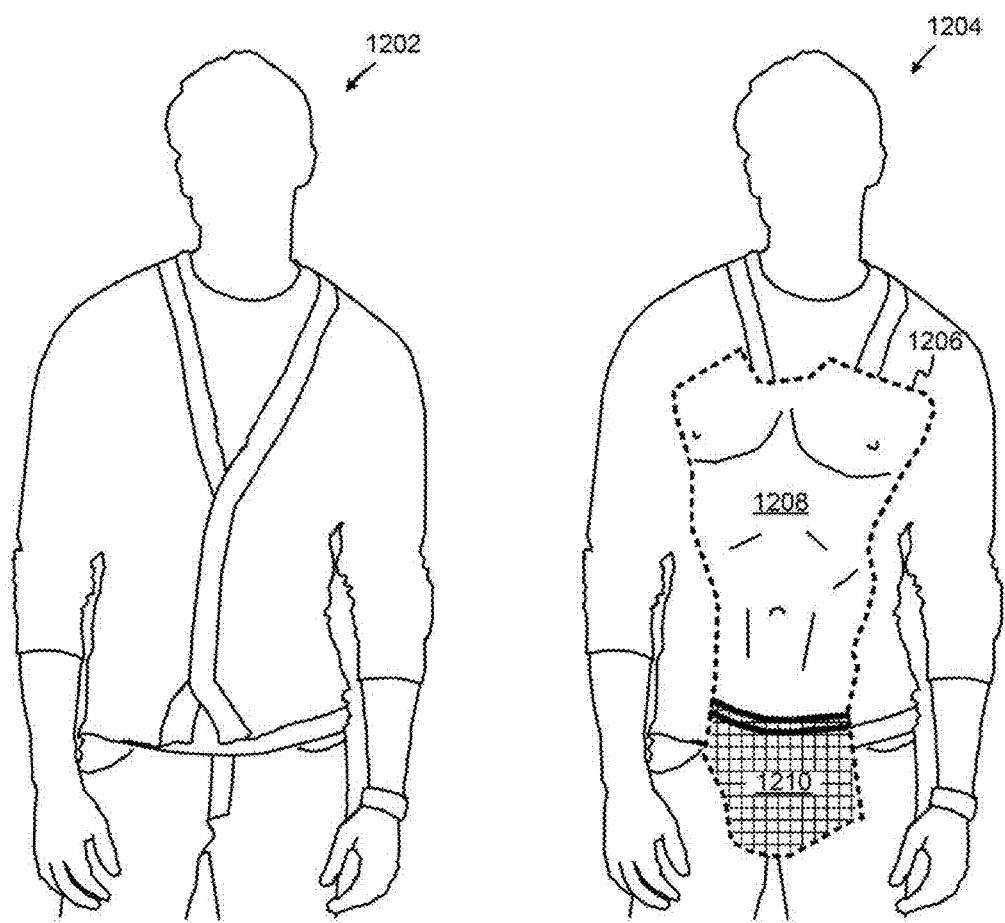
FIG. 12 is a diagram depicting another example of a result image, according to at least one embodiment.

FIG. 12 is a diagram depicting another example of a result image, according to at least one embodiment of the invention. In this example, an interface can be used to cause an image processor to form a result image 1204 based on a source image 1202, whereby result image 1204 includes an interior view image portion 1206. In this example, interior view image portion 1206 depicts a simulated body portion 1208 and adjunct imagery 1210 as simulated clothing, as generated by various implementations of embodiments described herein.

Figure 13A:
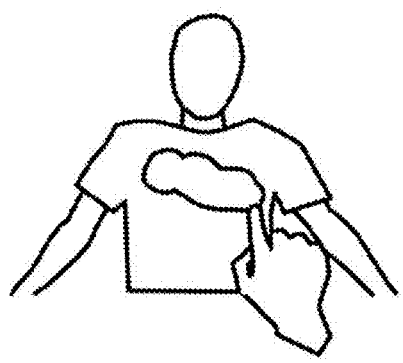
FIGS. 13A to 13D illustrates an example of an image processor configured to generate images as part of an application, according to various embodiments.
Figure 13B:
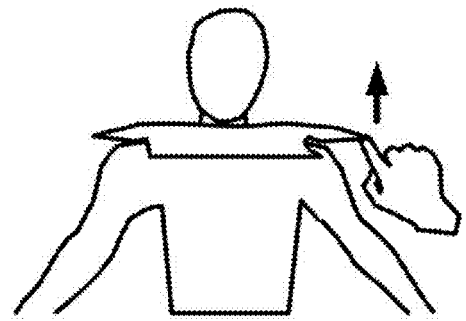
Figure 13C:
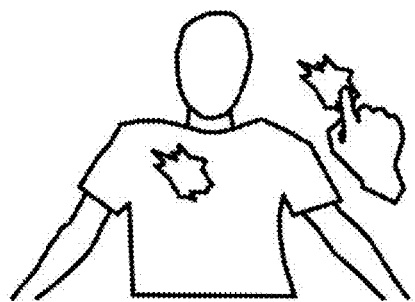
Figure 13D:
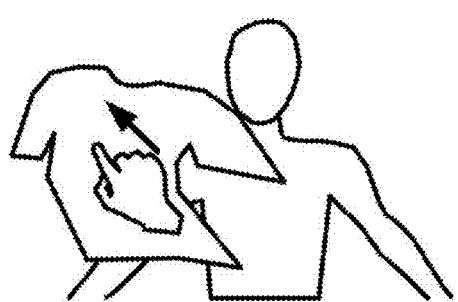

FIGS. 13A to 13D illustrate an example of an image processor used to generate images as part of an application, according to various embodiments. In at least one embodiment, an image processor can be configured to facilitate an application (e.g., an advertising or promotional application, or as a game). In particular, the image processor can be configured to remove clothing (e.g., simulated clothing) in different ways. FIG. 13A depicts a scratch-off implementation. FIG. 13B depicts a pull-off version (e.g., a finger can pull off clothing, with the piece follows the finger). FIG. 13C depicts a rip-off implementation. FIG. 13D depicts a stretch-off version. By using the image generator describes herein, the unclothed state of the torso appears consistent with the face of the person in the source image. In view of the foregoing, a user can modify a result image to remove or exclude portions of adjunct imagery, such as a simulated shirt shown in FIGS. 13A to 13D.

Figure 14:
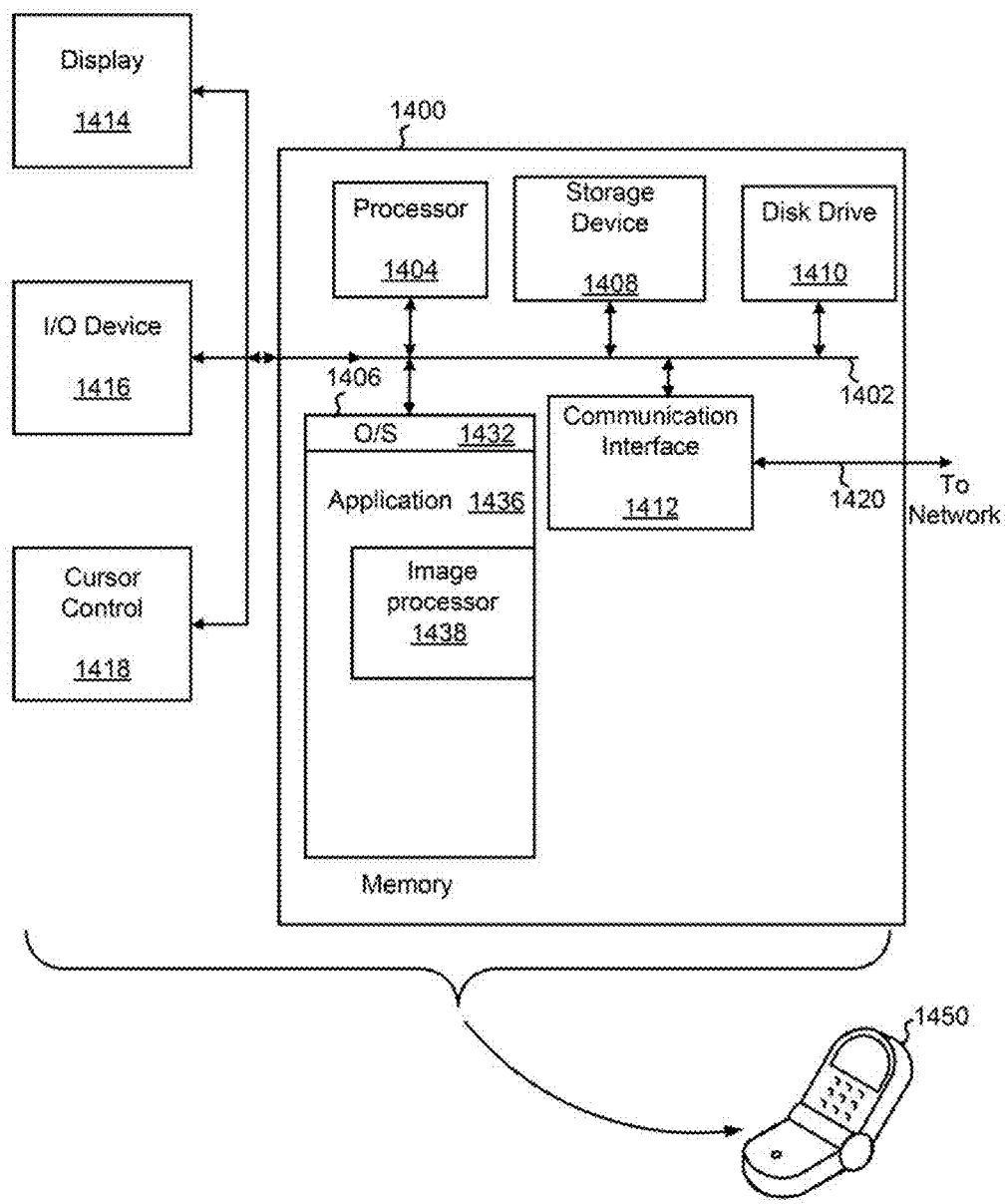
FIG. 14 illustrates an exemplary computer device suitable for simulating the appearance of a subject in various states of dress or wearing different simulated layers of clothing for the subject of an image, according to at least one embodiment of the invention.

FIG. 14 illustrates an exemplary computer device suitable for simulating the appearance of a subject in various states of dress or wearing different simulated layers of clothing for the subject of an image, according to at least one embodiment. In some examples, computer system 1400 can be used to implement computer programs, applications, methods, processes, or other software to perform the above-described techniques and to realize the structures described herein. Computer system 1400 includes a bus 1402 or other communication mechanism for communicating information, which interconnects subsystems and devices, such as one or more processors 1404, system memory ("memory") 1406, storage device 1408 (e.g., ROM), disk drive 1410 (e.g., the disk drive can be option and can be magnetic, optical, or solid state, or any other memory device), communication interface 1412 (e.g., a modem, Ethernet card, or any other interface configured to exchange data with a communications network), display 1414 (e.g., CRT or LCD), input device 1416 (e.g., touch-screen, keyboard), and pointer cursor control 1418 (e.g., mouse or trackball). In one embodiment, pointer Cursor control 1418 invokes one or more specialized commands to generate a simulated torso or body.

According to some examples, computer system 1400 performs specific operations in which processor 1404 executes one or more sequences of one or more instructions stored in system memory 1406. Such instructions can be read into system memory 1406 from another computer readable medium, such as static storage device 1408 or disk drive 1410. In some examples, hard-wired circuitry can be used in place of or in combination with software instructions for implementation. In the example shown, system memory 1406 includes modules of executable instructions for implementing an operation system ("O/S") 1432, an application 1436, and an image processor module 1438, which, in turn, can provide the functionalities described herein.

The term "computer readable medium" and "computer readable media" refer, at least in one embodiment, to any medium or media that participate in providing instructions to processor 1404 for execution. Such a medium or media can take many forms, including but not limited to, non-volatile media, volatile media, and transmission media. Non-volatile media includes, for example, optical or magnetic disks, such as disk drive 1410. Volatile media includes dynamic memory, such as system memory 1406. Transmission media includes coaxial cables, copper wire, and fiber optics, including wires that comprise bus 1402. Transmission media can also take the form of electromagnetic, acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions can be performed by a single computer system 1400. According to some examples, two or more computer systems 1400 coupled by communication link 1420 (e.g., links to LAN, PSTN, or wireless network) can perform the sequence of instructions in coordination with one another. Computer system 1400 can transmit and receive messages, data, and instructions, including program code (i.e., application code) through communication link 1420 and communication interface 1412. Received program code can be executed by processor 1404 as it is received, and/or stored in disk drive 1410, or other non-volatile storage for later execution. In one embodiment, system 1400 (or a portion thereof) can be implemented as a hand-held device, such as a mobile phone 1450. But in other embodiments, system 1400 can be implemented as a personal computer (i.e., a desk top computer) or any other computing device.

In at least some of the embodiments of the invention, the structures and/or functions of any of the above-described interfaces and panels can be implemented in software, hardware, firmware, circuitry, or a combination thereof. Note that the structures and constituent elements shown herein, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The various embodiments of the invention can be implemented in numerous ways, including as a system, a process, an apparatus, or a series of program instructions on a computer readable medium such as a computer readable storage medium or a computer network where the program instructions are sent over optical or electronic communication links. In general, the steps of disclosed processes can be performed in an arbitrary order, unless otherwise provided in the claims.

The foregoing description, for purposes of explanation, uses specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

The invention claimed is:

1. A non-transitory tangible computer-readable medium executable in association with a processor, the computer-readable medium comprising executable instructions to:
   capture data representing a source image including a human body;
   generate for an interface a first interface portion configured to display a reference body portion of the human body;
   identify the reference body portion of the human body, the reference body portion serving as a reference with which to generate an approximated body portion of the human body;
   adjust the size of the approximated body portion to match a range of sizes in which the approximated body portion is proportional to the reference body portion;
   determine whether to display adjunct imagery in association with the approximated body portion or to display a simulated body portion;
   generate for the interface a second interface portion configured to display either the adjunct imagery or the simulated body portion, or both;
   determine a periphery of the approximated body portion;
   generate within the periphery an interior view including the simulated body portion;
   generate a mask;
   apply data representing the mask to generate data representing the simulated body portion to form the interior view; and
   modify the source image to include the interior view to form a result image.

2. The non-transitory tangible computer-readable medium of claim 1 further comprising executable instructions to:
   accepting a selection signal indicative of data representing the adjunct imagery; and
   modifying the result image to include the adjunct imagery, wherein the result image is displayed with the adjunct imagery.

3. A non-transitory tangible computer-readable medium executable in association with a processor, the computer-readable medium comprising executable instructions to:
   capture data representing a source image including a human body;
   generate for an interface a first interface portion configured to display a reference body portion of the human body;
   identify the reference body portion of the human body, the reference body portion serving as a reference with which to generate an approximated body portion of the human body;
   adjust the size of the approximated body portion to match a range of sizes in which the approximated body portion is proportional to the reference body portion;
   determine whether to display adjunct imagery in association with the approximated body portion or to display a simulated body portion;
   generate for the interface a second interface portion configured to display either the adjunct imagery or the simulated body portion, or both;
   select a silhouette from a plurality of silhouettes;
   display the silhouette relative to the reference body portion; and
   accept an adjustment signal to adjust the size of the silhouette to the range of sizes,
   wherein the silhouette represents at least a boundary of the approximated body portion.

4. The non-transitory tangible computer-readable medium of claim 3 further comprising executable instructions to:
   accept an modification signal indicative of data representing a displacement of a portion of an edge of the silhouette,
   wherein the displacement of the portion of the edge of the silhouette is configured to modify the approximated body portion.

5. The non-transitory tangible computer-readable medium of claim 3 further comprising executable instructions to:
   determine to display the adjunct imagery in association with the approximated body portion;
   identify body portion dimensions for the approximated body portion; and
   generate the second interface portion to display the adjunct imagery to obscure the approximated body portion.

6. The non-transitory tangible computer-readable medium of claim 3 wherein the executable instructions to identify the reference body portion of the human body comprise executable instructions to:
   detect that the reference body portion includes features representative of a human face.

7. The non-transitory tangible computer-readable medium of claim 1 further comprising executable instructions to:
   determine to display the simulated body portion;
   select a subset of data representing the simulated body portion; and
   display the simulated body portion.

8. The non-transitory tangible computer-readable medium of claim 7 wherein further comprising executable instructions to:
   modify the simulated body portion to either include the adjunct imagery or exclude portions of adjunct imagery.

9. The non-transitory tangible computer-readable medium of claim 7 wherein the executable instructions to select the subset of data representing the simulated body portion comprise executable instructions to:
   extract image data from a body image repository including a plurality of files including data representing a plurality of simulated body portions.

10. The non-transitory tangible computer-readable medium of claim 7 wherein the executable instructions to select the subset of data representing the simulated body portion comprise executable instructions to:
    select a model including data representing attributes to generate the simulated body portion; and
    modify the simulated body portion to include the adjunct imagery.

11. The non-transitory tangible computer-readable medium of claim 7 wherein the executable instructions to select the subset of data representing the simulated body portion comprise executable instructions to:
- generate a three-dimensional model including data representing the simulated body portion,
  wherein the executable instructions to generate the three-dimensional model comprise executable instructions to:
  - capture multiple source images of the human body, the multiple source images including different views of the human body oriented about an axis at different angles;
  - interpolate views of the human body between two source images to form interpolated source images; and
  - combine data representing the human body in the multiple source images and the interpolated source images to apply as a layer on one or more approximated body portions constituting an approximation of a three-dimensional shape of the human body.

12. The non-transitory tangible computer-readable medium of claim 7 wherein the executable instructions to generate a three-dimensional model comprise executable instructions to:
- accept input data representing one or more dimensions for generating the simulated body portion.

13. A mobile communication device including a processor, a user interface and memory, the mobile communication device comprising:
- an image capture device configured to capture a source image including data representing a human body having at least one clothed body part;
- an image processor comprising:
  - a face detector configured to identity in the source image a face as a reference body portion of the human body; and
  - a body generator configured to determine one or more simulated body portions, and to adjust data representing at least one simulated body portion configured to position the at least one simulated body portion on the user interface relative the face as the reference body portion; and
  - an image modifier configured to generate a result image including an adjunct image; and
- a user input configured select the adjunct image from a group of adjunct images for display in the result image including the face and the at least one simulate body portion.

14. The mobile communication device of claim 13 further comprising:
- a body approximator configured to generate a silhouette to overlay upon an image of the human body, the silhouette being adjustable responsive to adjustment signals; and
- an interior view module configured to generate an image of an interior view overlaid on the clothed body part.

15. The mobile communication device of claim 13 wherein the image capture device comprises:
- a three dimensional camera.

16. The mobile communication device of claim 13 further comprising:
- a model generator comprising:
  - an image capture controller configured to capture multiple source images each depicting different two-dimensional surfaces of the human body; and
  - an interpolator configured to convert data representing the two-dimensional surfaces of the human body into a three dimensional model of the human body,
  wherein the three dimensional model includes data representing the one or more simulated body portions.

17. The mobile communication device of claim 13 further comprising:
- a transceiver controller configured to communicate the source image via a network to a server constituting a remote model builder, the remote model builder is configured to generate a model of the human body,
wherein the transceiver controller is configured to receive data representing the model of the human body.

18. The mobile communication device of claim 13 further comprising:
- a transceiver controller configured to communicate an access code and data representing the model of the human body via a network to a server constituting an adjunct data aggregator configured to aggregate adjunct images from a plurality of different adjunct data repositories of different retail environments, the transceiver controller is configured further to transmit signals via the network to generate displays of the model being associated with the adjunct images and to select one of the adjunct images for a purchase transaction,
wherein the adjunct images represent clothing.

* * * * *